United States Patent
Wang et al.

(10) Patent No.: US 9,143,986 B2
(45) Date of Patent: Sep. 22, 2015

(54) LOAD COMPENSATION METHOD, MEASURING METHOD FOR LOAD ESTIMATION, BASE STATION AND USER EQUIPMENT

(71) Applicant: FUJITSU LIMITED, Kawasaki-shi, Kanagawa (JP)

(72) Inventors: Weiwei Wang, Beijing (CN); Zhaojun Li, Beijing (CN); Yanling Lu, Beijing (CN); Haibo Xu, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/159,015

(22) Filed: Jan. 20, 2014

(65) Prior Publication Data

US 2014/0135030 A1  May 15, 2014

Related U.S. Application Data

(63) Continuation of application No. PCT/CN2011/077620, filed on Jul. 26, 2011.

(51) Int. Cl.
*H04W 28/08* (2009.01)
*H04W 52/02* (2009.01)

(52) U.S. Cl.
CPC .......... *H04W 28/08* (2013.01); *H04W 52/0206* (2013.01); *Y02B 60/50* (2013.01)

(58) Field of Classification Search
CPC .................. H04W 52/0206; H04L 5/1438
USPC ............ 455/453, 226.1, 226.3, 522; 370/331, 370/332, 252
See application file for complete search history.

(56) References Cited

U.S. PATENT DOCUMENTS

2009/0059861 A1* 3/2009 Gunnarsson et al. .......... 370/331
2009/0286566 A1* 11/2009 Lindholm et al. ............. 455/522

FOREIGN PATENT DOCUMENTS

CN 102065448 5/2011
CN 102083145 6/2011
(Continued)

OTHER PUBLICATIONS

Extended European search report with supplementary European search report and the European search opinion issued for corresponding European Patent Application No. 11869815.8, mailed on Feb. 5, 2015.
International search report issued for corresponding international application No. PCT/CN2011/077620, mailed Apr. 19, 2012.
(Continued)

*Primary Examiner* — Phuoc H Doan
(74) *Attorney, Agent, or Firm* — Myers Wolin, LLC

(57) ABSTRACT

Embodiments of the present invention provide a load compensation method, a measuring method for load estimation, a base station and user equipment. The load compensation method includes: obtaining, by a base station of compensation cell, an estimated value of a resource needed by user equipment of energy-saving cell in the compensation cell according to signal quality of the compensation cell measured by the user equipment of the energy-saving cell; determining whether to compensate for the energy-saving cell according to the estimated value of the resource needed by user equipment of the energy-saving cell in the compensation cell; and increasing power of related resources to compensate for the energy-saving cell after it is determined to compensate for the energy-saving cell. With the embodiments of the present invention, the resources of the compensation cell occupied by the user equipment of the energy-saving cell may be reflected, thereby improving accuracy of load compensation.

15 Claims, 9 Drawing Sheets

(56) References Cited

FOREIGN PATENT DOCUMENTS

| | | |
|---|---|---|
| CN | 102083192 | 6/2011 |
| JP | 10-032540 A | 2/1998 |
| JP | 2009-506702 A | 2/2009 |
| WO | 2007/027032 A1 | 3/2007 |
| WO | 2011/006847 A1 | 1/2011 |

OTHER PUBLICATIONS

Office Action issued by the Japan Patent Office for corresponding Japanese Patent Application No. 2014-521896, mailed on Jul. 28, 2015, with an English translation.

Zte, "The solution for compensation mode energy saving", Agenda Item: 19, 3GPP TSG RAN WG3 Meeting #72, R3-111358, Barcelona, Spain, May 9-13, 2011.

* cited by examiner probing, by a base station of the compensation cell, through increasing transmission power of one or more subframes, so that user equipment of the energy-saving cell measures signal quality of the compensation cell according to the one or more subframes — 1301

Fig. 13 measuring, by user equipment of the energy-saving cell, signal quality of the compensation cell according to one or more subframes whose transmission power is increased by a base station of the compensation cell — 1401 transmitting, by the user equipment of the energy-saving cell, the measured signal quality of the compensation cell to a base station of the energy-saving cell — 1402

Fig. 14

LOAD COMPENSATION METHOD, MEASURING METHOD FOR LOAD ESTIMATION, BASE STATION AND USER EQUIPMENT

CROSS-REFERENCE TO RELATED APPLICATIONS

This is a continuation of International Application No. PCT/CN2011/077620, filed on Jul. 26, 2011, now pending, the contents of which are herein wholly incorporated by reference.

TECHNICAL FIELD

The present invention relates to the field of communications, and in particular to a load compensation method, a measuring method for load estimation, a base station and user equipment.

BACKGROUND

Energy-saving in networks is an important research subject for an existing long-term evolution-advanced (LTE-A) system, wherein, one research scenario is to divide cells in the network into energy-saving cells and compensation cells, these compensation cells and energy-saving cells operating in identical frequencies. When a load of the network is relatively light, part or all of the energy-saving cells may be switched off, and the compensation cells may cover serving areas of these energy-saving cells by increasing transmission power. In such a scenario, such mutual information as a load, and capacity, etc., may be negotiated between the energy-saving cells and the compensation cells by using some pieces of signaling, so that the compensation cells decide how to provide compensation to the energy-saving cells.

However, in the implementation of the present invention, the inventors found that the defect of the relevant art resides in: some pieces of load information are interacted between base stations of the compensation cells and the energy-saving cells by using signaling, but these pieces of load information are loads seen by the energy-saving cells, and may not reflect how many bandwidths of the compensation cells will be occupied, and hence, it cannot be decided to provide compensation to the coverage areas by the compensation cells or to proceed to serve by the energy-saving cells.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY

Embodiments of the present invention provide a load compensation method, a measuring method for load estimation, a base station and user equipment, with an aspect to obtain an estimated value of a resource needed by user equipment of an energy-saving cell in a compensation cell, so as to decide to provide compensation to coverage areas by the compensation cell or to proceed to serve by the energy-saving cell.

According to one aspect of the embodiments of the present invention, there is provided a load compensation method, applicable to a communication system jointly served by a compensation cell and an energy-saving cell, the method including:

an estimated value acquiring process for obtaining, by a base station of the compensation cell, an estimated value of a resource needed by user equipment of the energy-saving cell in the compensation cell according to signal quality of the compensation cell measured by the user equipment of the energy-saving cell;

a compensation deciding process for determining whether to compensate for the energy-saving cell according to the estimated value of the resource needed by user equipment of the energy-saving cell in the compensation cell; and a load compensating process for increasing power of related resources to compensate for the energy-saving cell after it is determined to compensate for the energy-saving cell.

According to another aspect of the embodiments of the present invention, there is provided a load compensation method, applicable to a communication system jointly served by a compensation cell and an energy-saving cell, the method including:

a signal value receiving process for receiving, by a base station of the energy-saving cell, signal quality of the compensation cell measured and transmitted by user equipment of the energy-saving cell; and a deactivation request transmitting process for transmitting a deactivation request message to a base station of the compensation cell, so that the base station of the compensation cell obtains an estimated value of a resource needed by user equipment of the energy-saving cell in the compensation cell according to the deactivation request message.

According to a further aspect of the embodiments of the present invention, there is provided a measuring method for load estimation, applicable to a communication system jointly served by a compensation cell and an energy-saving cell, the method including:

a probe realizing process for probing, by a base station of the compensation cell, through increasing transmission power of one or more subframes, so that user equipment of the energy-saving cell measures signal quality of the compensation cell according to the one or more subframes.

According to still another aspect of the embodiments of the present invention, there is provided a measuring method for load estimation, applicable to a communication system jointly served by a compensation cell and an energy-saving cell, the method including:

a signal measuring process for measuring, by user equipment of the energy-saving cell, signal quality of the compensation cell according to one or more subframes whose transmission power is increased by a base station of the compensation cell.

According to still another aspect of the embodiments of the present invention, there is provided a base station, applicable to a communication system jointly served by a compensation cell and an energy-saving cell, the base station including:

an estimated value acquiring unit, configured to obtain an estimated value of a resource needed by user equipment of the energy-saving cell in the compensation cell according to signal quality of the compensation cell measured by the user equipment of the energy-saving cell;

a compensation deciding unit, configured to determine whether to compensate for the energy-saving cell according to the estimated value of the resource needed by user equipment of the energy-saving cell in the compensation cell; and a load compensating unit, configured to increase power of related resources to compensate for the energy-saving cell after it is determined by the compensation deciding unit to compensate for the energy-saving cell.

According to still another aspect of the embodiments of the present invention, there is provided a base station, applicable to a communication system jointly served by a compensation cell and an energy-saving cell, the base station including:

a signal value receiving unit, configured to receive signal quality of the compensation cell measured and transmitted by user equipment of the energy-saving cell; and a deactivation request transmitting unit, configured to transmit a deactivation request message to a base station of the compensation cell, so that the base station of the compensation cell obtains an estimated value of a resource needed by user equipment of the energy-saving cell in the compensation cell according to the deactivation request message.

According to still another aspect of the embodiments of the present invention, there is provided user equipment, applicable to a communication system jointly served by a compensation cell and an energy-saving cell, the user equipment including:

a signal measurer, configured to measure signal quality of the compensation cell according to one or more subframes whose transmission power is increased by a base station of the compensation cell.

According to still another aspect of the embodiments of the present invention, there is provided a computer-readable program, wherein when the program is executed in user equipment, the program enables a computer to carry out the method as described above in the user equipment.

According to still another aspect of the embodiments of the present invention, there is provided a storage medium in which a computer-readable program is stored, wherein the computer-readable program enables a computer to carry out the method as described above in user equipment.

According to still another aspect of the embodiments of the present invention, there is provided a computer-readable program, wherein when the program is executed in a base station, the program enables a computer to carry out the method as described above in the base station.

According to still another aspect of the embodiments of the present invention, there is provided a storage medium in which a computer-readable program is stored, wherein the computer-readable program enables a computer to carry out the method as described above in a base station.

The advantage of the embodiments of the present invention resides in that the base station of the compensation cell determines whether to compensate for the energy-saving cell according to the estimated value of the resource needed by the user equipment of the energy-saving cell in the compensation cell, which may reflect the resources of the compensation cell that will be occupied by the user equipment of the energy-saving cell, thereby improving the accuracy of load compensation.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or reduced.

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

FIG. 13 is a flowchart of the measuring method for load estimation of Embodiment 3 of the present invention;

FIG. 14 is another flowchart of the measuring method for load estimation of Embodiment 3 of the present invention;

DETAILED DESCRIPTION

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the appended claims.

Embodiment 1

An embodiment of the present invention provides a load compensation method, applicable to a communication system jointly served by a compensation cell and an energy-saving cell. The method shall be described in detail below at a base station side of the compensation cell.

Figure 1:
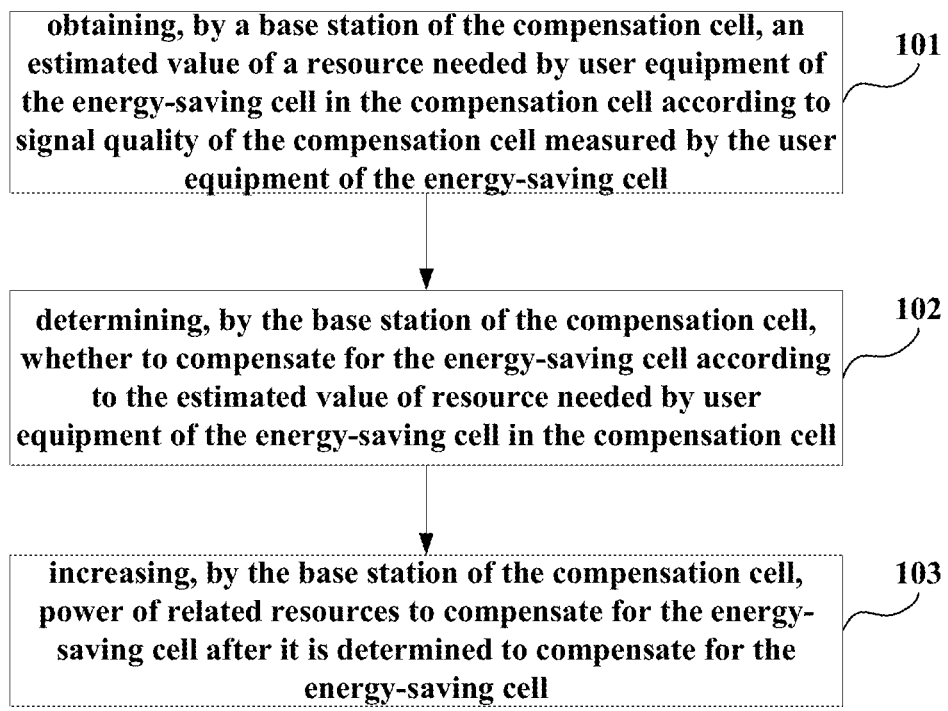
FIG. 1 is a flowchart of the load compensation method of Embodiment 1 of the present invention.

FIG. 1 is a flowchart of the load compensation method of Embodiment 1 of the present invention. As shown in FIG. 1, the method includes:

step 101: obtaining, by a base station of the compensation cell, an estimated value of a resource needed by user equipment of the energy-saving cell in the compensation cell according to signal quality of the compensation cell measured by the user equipment of the energy-saving cell;

step 102: determining, by the base station of the compensation cell, whether to compensate for the energy-saving cell according to the estimated value of the resource needed by user equipment of the energy-saving cell in the compensation cell; and step 103: increasing, by the base station of the compensation cell, power of related resources to compensate for the energy-saving cell after it is determined to compensate for the energy-saving cell.

In this embodiment, after the compensation deciding step of determining to compensate for the energy-saving cell in step 102, the method may further include deactivation response step: transmitting a deactivation response message to the base station of the energy-saving cell, the deactivation response message including resource information for compensation.

Therefore, the base station of the energy-saving cell may hand the user equipment of the energy-saving cell over to the compensation cell according to the deactivation response message, and switch off the energy-saving cell. Whether the energy-saving cell is compensated is determined according to the estimated value of the resource needed by user equipment of the energy-saving cell in the compensation cell. This may reflect the resources of the compensation cell to be occupied, and improves the accuracy of load compensation.

In an embodiment, in executing step 101, the base station of the compensation cell may receive a deactivation request message transmitted by the base station of the energy-saving cell, the deactivation request message including signal quality of the compensation cell measured by the user equipment of the energy-saving cell; and the base station of the compensation cell obtains the estimated value of the resource through estimation according to the signal quality of the compensation cell measured by the user equipment of the energy-saving cell.

In particular, the user equipment of the energy-saving cell may measure the signal quality of the compensation cell, and may transmit the signal quality of the compensation cell to the base station of the energy-saving cell. The measuring method for load estimation of the present invention that is described below may be adopted for measuring the signal quality of the compensation cell; however, it is not limited thereto, and other manners of measurement may be adopted as actually required.

Then, the base station of the energy-saving cell may transmit a deactivation request message to the base station of the compensation cell, the deactivation request message including the signal quality of the compensation cell measured by the user equipment of the energy-saving cell. After receiving the deactivation request message, the base station of the compensation cell may perform load estimation to obtain the estimated value of the resource according to the signal quality of the compensation cell measured by the user equipment of the energy-saving cell.

In particular implementation, In an embodiment, the base station of the compensation cell may adopt the following formula to perform load estimation on each piece of user equipment of the energy-saving cell:

$$BW_{ES}\log_2(1+SINR_{ES})=BW_{CP}\log_2(1+SINR_{CP})$$

where, $BW_{ES}$ represents the resource occupied by the user equipment of the energy-saving cell in the energy-saving cell, $BW_{CP}$ represents the resource occupied by the user equipment of the energy-saving cell in the compensation cell, $SINR_{ES}$ represents the signal quality of the energy-saving cell measured by the user equipment of the energy-saving cell, and $SINR_{CP}$ represents the signal quality of the compensation cell measured by the user equipment of the energy-saving cell.

In particular implementation, $BW_{ES}$ and $SINR_{ES}$ may be obtained in a manner of the relevant art. Hence, $BW_{CP}$ may be calculated in a case where $SINR_{CP}$ is obtained, thereby obtaining the estimated value of the resource needed by user equipment of the energy-saving cell in the compensation cell.

Furthermore, an estimated value of the total resources of the compensation cell occupied by all the users of the energy-saving cell may be obtained by summing up the estimated values of the resources of all the users of the energy-saving cell, and whether to compensate for the energy-saving cell may be determined according to the estimated value of the total resources.

In another embodiment, the resource estimation may include: estimating a modulation coding scheme needing to be adopted by the user equipment in the compensation cell according the signal quality of the compensation cell measured by the user equipment of the energy-saving cell; and estimating the resource occupied in the compensation cell according the modulation coding scheme.

In particular implementation, after the modulation coding scheme needing to be adopted by the user equipment in the compensation cell is estimated, the resource in the compensation cell needing to be occupied may be estimated simultaneously according to a service status of each piece of user equipment. The relevant art may be adopted for the estimation of the modulation coding scheme, which shall not be describe herein any further.

Furthermore, the deactivation request message may include: current energy consumption of the energy-saving cell, and QoS information of the users of the energy-saving cell, etc., wherein the current energy consumption of the energy-saving cell may be for example the energy consumed by each bit, the bit being a bit of an application layer, and being also a bit of a physical layer; and the QoS information of the users of the energy-saving cell may be for example a service type, and a QoS requirement, of each user, etc. Therefore, with such information, the base station of the compensation cell may further determine the related resources of which the power is to be increased to compensate for the energy-saving cell, thereby further improving the performance and accuracy of the compensation.

Figure 2:
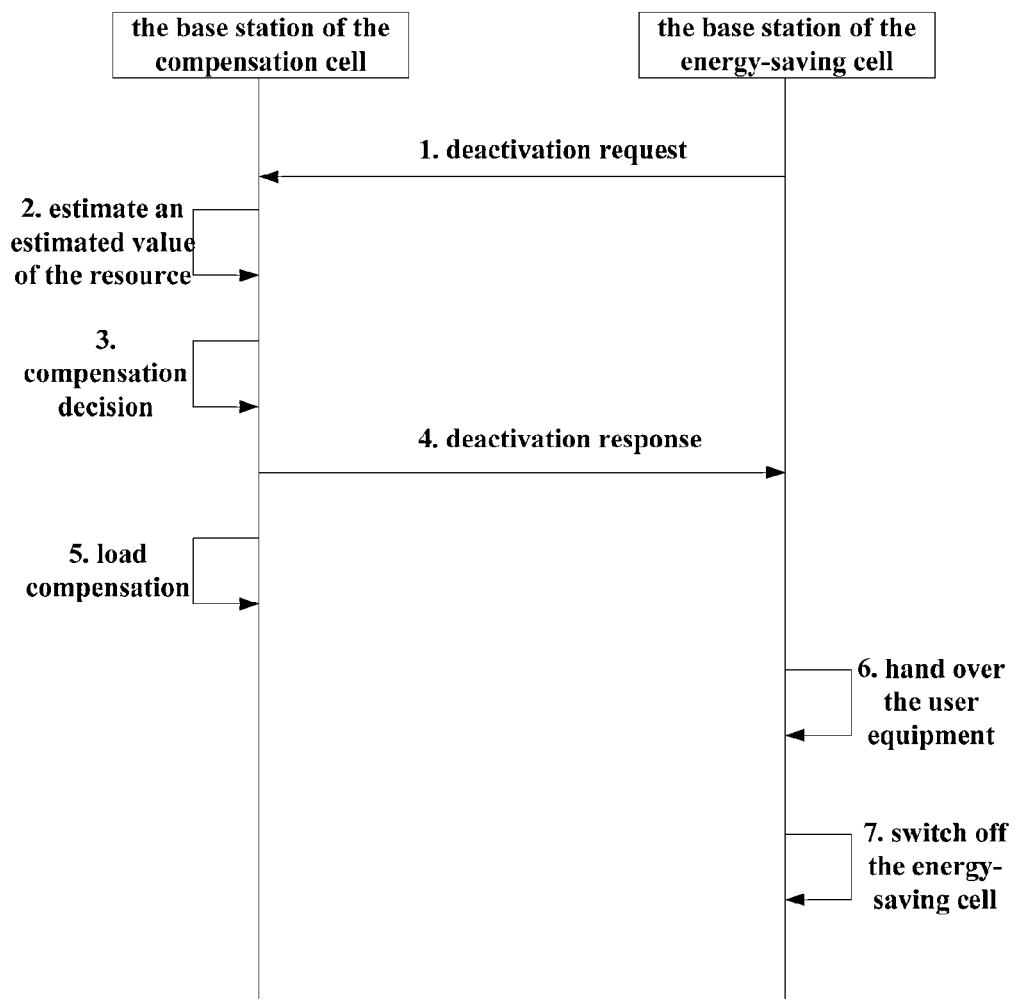
FIG. 2 is a schematic diagram of signaling of the load compensation method of Embodiment 1 of the present invention.

FIG. 2 is a schematic diagram of signaling of the load compensation method of an embodiment of the present invention. As shown in FIG. 2, first, the base station of the compensation cell receives a deactivation request message transmitted by the base station of the energy-saving cell, the deactivation request message including signal quality of the compensation cell measured by the user equipment of the energy-saving cell, and optionally also may include current energy consumption of the energy-saving cell, and QoS information of the users of the energy-saving cell, etc.; and the base station of the compensation cell may estimate an estimated value of the resource in the compensation cell needed by the user equipment of the energy-saving cell according to the signal quality of the compensation cell measured by the user equipment of the energy-saving cell in the message.

Second, the base station of the compensation cell may determine whether to compensate for the energy-saving cell according to the estimated value of the resource in the compensation cell needed by the user equipment of the energy-saving cell, the current energy consumption of the energy-saving cell and the QoS information of the users of the energy-saving cell, etc.

Third, the base station of the compensation cell may transmit a deactivation response message to the base station of the energy-saving cell after determining to compensate for the energy-saving cell, so that the energy-saving cell hand over the user equipment served by it to the compensation cell according to the deactivation response message; and the base station of the compensation cell may increase power of related resources to compensate for the energy-saving cell.

In another embodiment, in executing step 101, the base station of the compensation cell may receive a deactivation request message transmitted by the base station of the energy-saving cell, the deactivation request message including an estimated value of a resource, the estimated value of the resource being obtained by the base station of the energy-saving cell according to the signal quality of the compensation cell measured by the user equipment of the energy-saving cell.

In particular, the estimated value of the resource may be obtained by the base station of the energy-saving cell through estimation, in the two manners of resource estimation as described above, which shall not be described herein any further.

Figure 3:
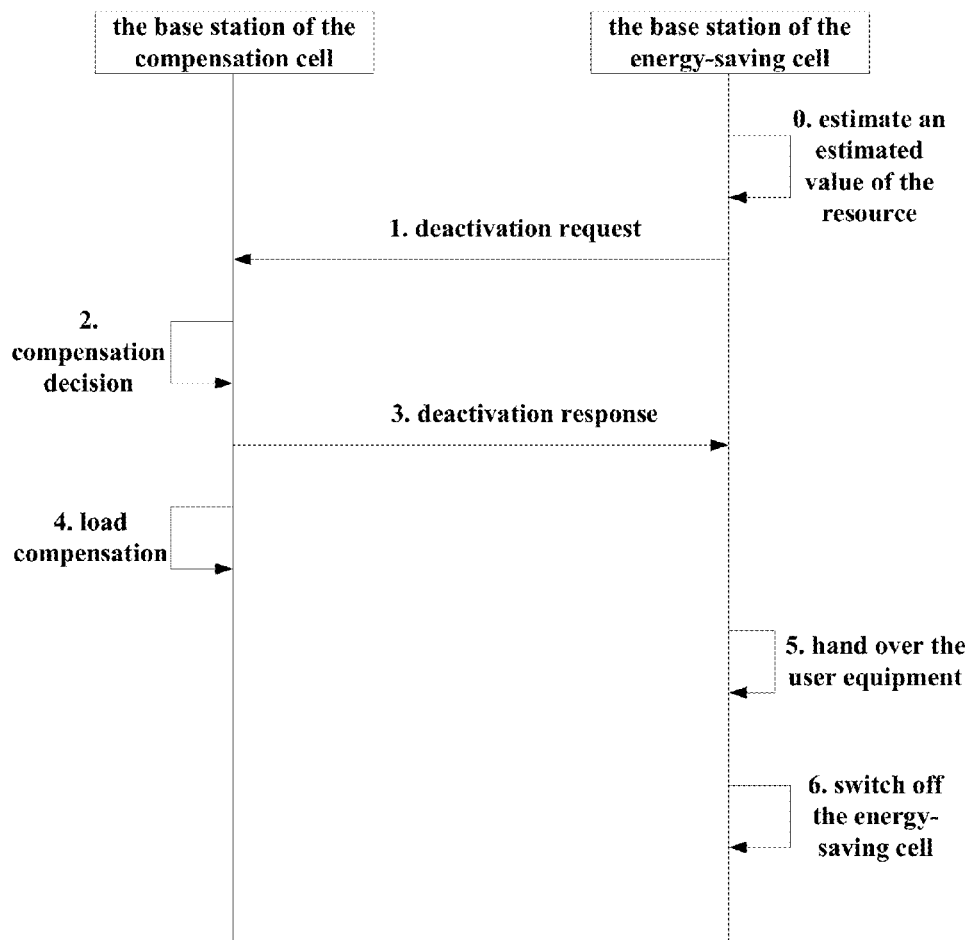
FIG. 3 is a schematic diagram of another piece of signaling of the load compensation method of Embodiment 1 of the present invention.

FIG. 3 is a schematic diagram of another piece of signaling of the load compensation method of an embodiment of the present invention. As shown in FIG. 3, first, the base station of the compensation cell receives a deactivation request message transmitted by the base station of the energy-saving cell, the deactivation request message including an estimated value of the resource of the compensation cell needed by the user equipment of the energy-saving cell, and optionally also may include current energy consumption of the energy-saving cell, and QoS information of the users of the energy-saving cell, etc.

Second, the base station of the compensation cell may determine whether to compensate for the energy-saving cell according to the estimated value of the resource in the compensation cell needed by the user equipment of the energy-saving cell, the current energy consumption of the energy-saving cell and the QoS information of the users of the energy-saving cell, etc.

Third, the base station of the compensation cell may transmit a deactivation response message to the base station of the energy-saving cell after determining to compensate for the energy-saving cell, so that the energy-saving cell hand over the user equipment served by it to the compensation cell according to the deactivation response message; and the base station of the compensation cell may increase power of related resources to compensate for the energy-saving cell.

How to perform load compensation is described in detail above, wherein, the current energy consumption of the energy-saving cell and the QoS information of the users of the energy-saving cell, etc. are optional, and not necessary. In particular implementation, more information may be employed in compensation decision making as actually required, so that the decision making is more accurate. It should be noted that the estimation of load may be performed at the base station side of the compensation cell, and may also be performed at the base station side of the energy-saving cell.

Following detailed description is given to how perform measurement for load estimation.

In this embodiment, before the estimated value acquiring step in step 101, the method may further include: a probe realizing step: probing, by the base station of the compensation cell, through increasing the transmission power of one or more subframes, so that the user equipment of the energy-saving cell measures the signal quality of the compensation cell according to the one or more subframes.

In particular implementation, the base station of the compensation cell may increase the transmission power of the whole subframes of the one or more subframes, or increases the transmission power of partial resources of the one or more subframes.

Figure 4:
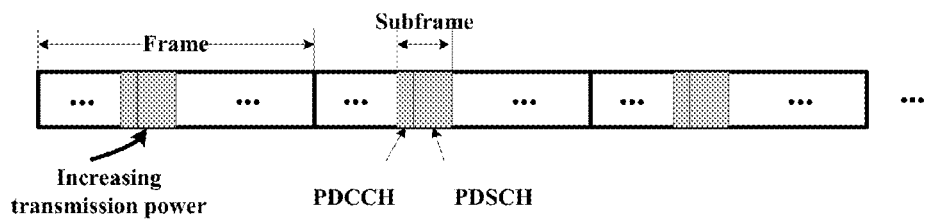
FIG. 4 is a schematic diagram of increasing whole subframe transmission power of Embodiment 1 of the present invention.
Figure 5:
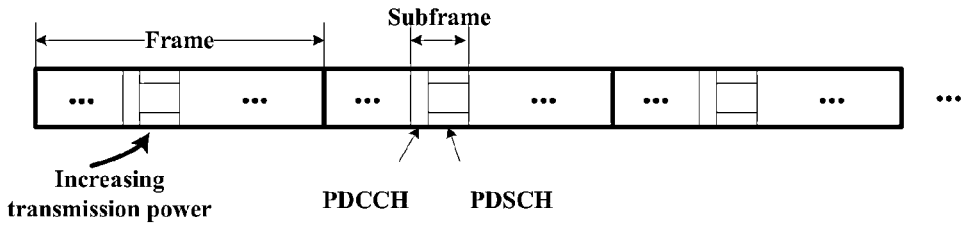
FIG. 5 is a schematic diagram of increasing transmission power of part of the resources in a subframe of Embodiment 1 of the present invention.

FIG. 4 is a schematic diagram of increasing whole subframe transmission power of an embodiment of the present invention, and FIG. 5 is a schematic diagram of increasing transmission power of part of the resources in a subframe of an embodiment of the present invention. As shown in FIGS. 4 and 5, these subframes of high power may be periodic, aperiodic, or consecutive, according to scheduling of resources of the base station of the compensation cell itself. However, it is not limited thereto, and particular modes of implementation may be determined as actually required.

In particular implementation, the base station of the energy-saving cell may selectively avoid scheduling user equipment in these subframes, and may configure the measurement in these subframes at the same time, therefore, the user equipment served by it may estimate the signal quality of the compensation cell, such as signal-to-interference plus noise ratio (SINR), reference signal received quality (RSRQ), etc.

After obtaining a result of measurement, the user equipment of the energy-saving cell transmits the result to the base station of the energy-saving cell. The load estimation may be performed by the base station of the energy-saving cell, and may also be performed by the base station of the compensation cell, which are as described above, and shall not be described herein any further.

In order to better set a probe function of a base station, signaling may be interacted between the base station of the compensation cell and the base station of the energy-saving cell, and the base station of the compensation cell may notify the base station of the energy-saving cell of which of the subframes shall be increased with respect to power to perform load estimation.

In particular implementation, in an embodiment, a flow of signaling may be initiated by the base station of the energy-saving cell. The base station of the compensation cell receives a probe request message transmitted by the base station of the energy-saving cell, the probe request message including a probe resources acceptable to the base station of the energy-saving cell; and the base station of the compensation cell feeds a probe response message back to the base station of the energy-saving cell, the probe response message including the resources used by the base station of the compensation cell for probing.

Figure 6:
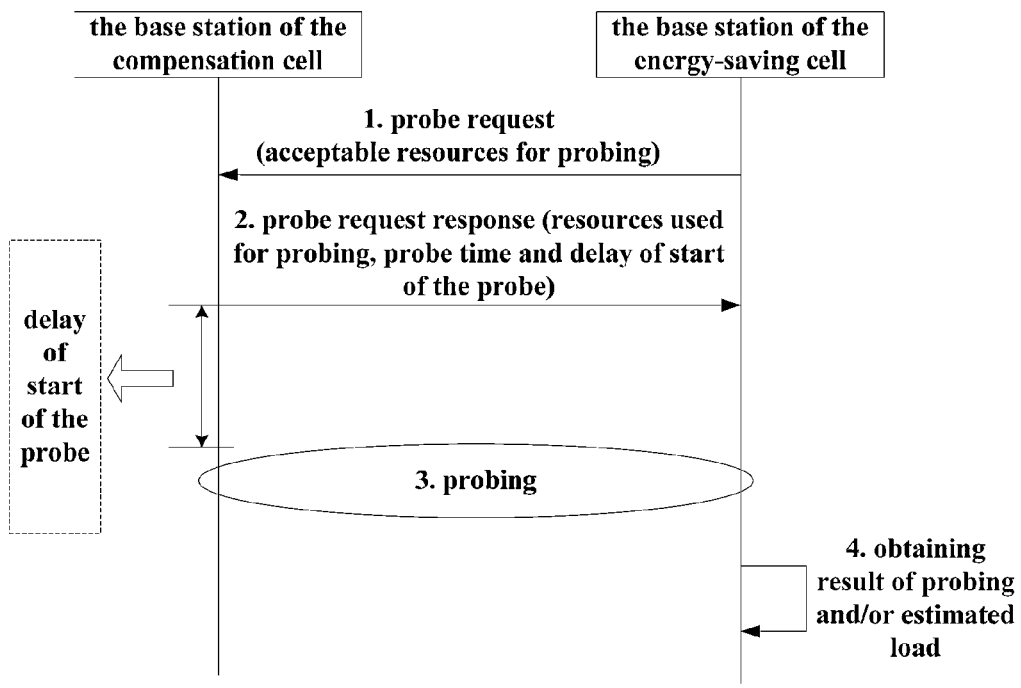
FIG. 6 is a schematic diagram of signaling of the probe of Embodiment 1 of the present invention.

FIG. 6 is a schematic diagram of signaling of the probe of an embodiment of the present invention. As shown in FIG. 6, first, the base station of the energy-saving cell transmits a probe request message to the base station of the compensation cell, the probe request message optionally may include acceptable resources used for probing, such as unused resource in the energy-saving cell; second, the base station of the compensation cell may feed back a probe response message after receiving the request message, the probe response message indicating resources in the compensation cell for probing, and optionally may include a probe time and delay of start of the probe;

wherein, the probe time may indicate duration of the probe, and the delay of start of the probe is used to ensure that power increase of the compensation cell and start of measurement by the user equipment of the energy-saving cell can be performed at the same time.

In particular implementation, in another embodiment, the flow of signaling may also be initiated by the base station of the compensation cell. The base station of the compensation cell transmits a probe request message to the base station of the energy-saving cell, the probe request message including resources of the base station of the compensation cell for probing; and the base station of the compensation cell receives a probe response message fed back by the base station of the energy-saving cell, the probe response message including probe resources acceptable to the base station of the energy-saving cell.

Figure 7:
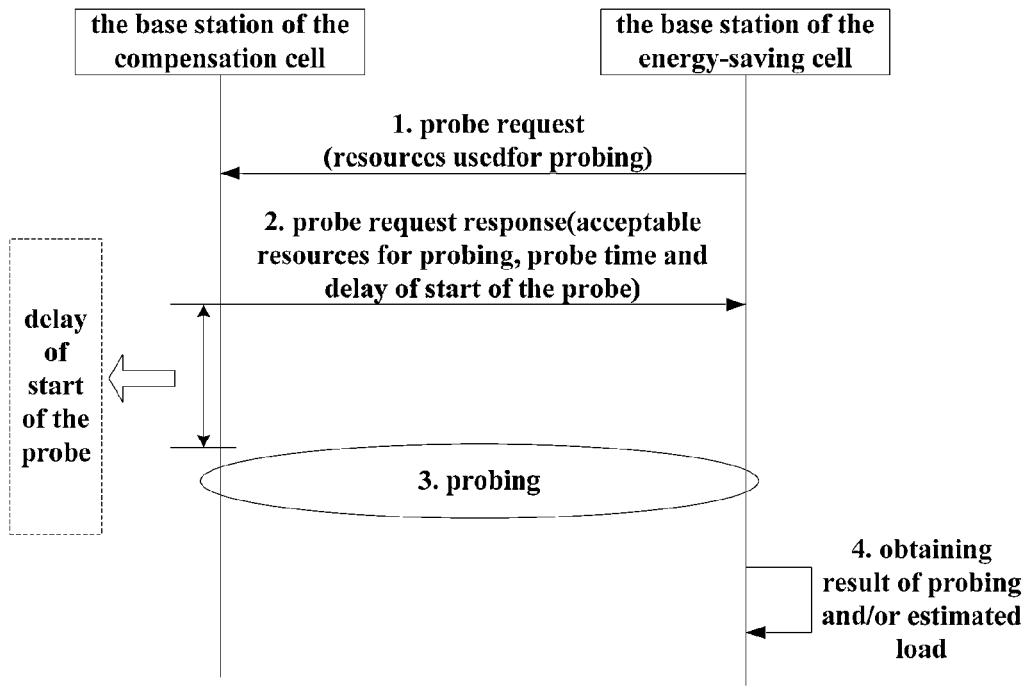
FIG. 7 is a schematic diagram of another piece of signaling of the probe of Embodiment 1 of the present invention.

FIG. 7 is a schematic diagram of another piece of signaling of the probe of an embodiment of the present invention. As shown in FIG. 7, first, the base station of the compensation cell transmits a probe request message to the base station of the energy-saving cell, the probe request message indicating resources in the compensation cell used for probing; then the energy-saving cell feed back a probe response message, the probe response message indicating acceptable resources in the compensation cell for probing, and optionally including a probe time and delay of start of the probe.

What is described above for probing signaling by a base station is illustrative only. However, it is not limited thereto. For example, the resources for probing may be directly determined from the probe resource information contained in the probe request message, without the use of the probe request response message; or predefined time or resources, etc., may be preset, without the use of signaling for probe interaction. Particular modes of implementation may be determined as actually required.

Figure 8:
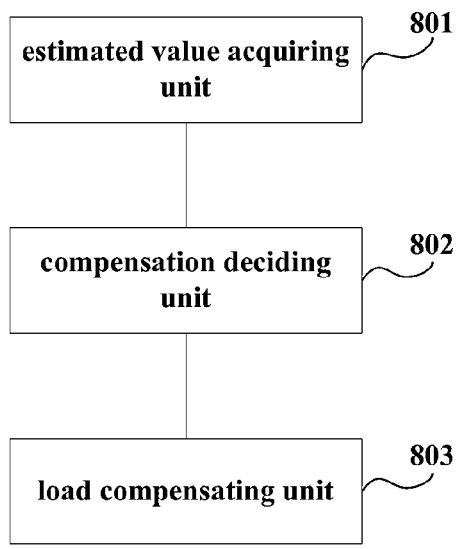
FIG. 8 is a schematic diagram of the structure of the base station of Embodiment 1 of the present invention.

An embodiment of the present invention further provides a base station of compensation cell, applicable to a communication system jointly served by a compensation cell and an energy-saving cell. FIG. 8 is a schematic diagram of the structure of the base station of the embodiment of the present invention. As shown in FIG. 8, the base station of compensation cell includes: an estimated value acquiring unit 801, a compensation deciding unit 802 and a load compensating unit 803;

wherein, the estimated value acquiring unit 801 is configured to obtain an estimated value of a resource needed by user equipment of the energy-saving cell in the compensation cell according to signal quality of the compensation cell measured by the user equipment of the energy-saving cell; the compensation deciding unit 802 is configured to determine whether to compensate for the energy-saving cell according to the estimated value of the resource needed by user equipment of the energy-saving cell in the compensation cell; and the load compensating unit 803 is configured to increase power of related resources to compensate for the energy-saving cell after it is determined by the compensation deciding unit to compensate for the energy-saving cell.

In an embodiment, the estimated value acquiring unit 801 includes a deactivation request receiving unit configured to receive a deactivation request message transmitted by a base station of the energy-saving cell, the deactivation request message including the estimated value of the resource, and the estimated value of the resource being obtained by the base station of the energy-saving cell through estimation according to the signal quality of the compensation cell measured by the user equipment of the energy-saving cell.

In another embodiment, the estimated value acquiring unit 801 may include a deactivation request receiving unit and a resource estimating unit, wherein, the deactivation request receiving unit is configured to receive a deactivation request message transmitted by a base station of the energy-saving cell, the deactivation request message including the signal quality of the compensation cell measured by the user equipment of the energy-saving cell; and the resource estimating unit is configured to obtain the estimated value of the resource through estimation according to the signal quality of the compensation cell measured by the user equipment of the energy-saving cell.

In particular implementation, in an embodiment, the resource estimating unit adopts the following formula to perform load estimation on each piece of user equipment of the energy-saving cell:

$$BW_{ES}\log_2(1+SINR_{ES})=BW_{CP}\log_2(1+SINR_{CP})$$

where, $BW_{ES}$ represents the resource occupied by the user equipment of the energy-saving cell in the energy-saving cell, $BW_{CP}$ represents the resource occupied by the user equipment of the energy-saving cell in the compensation cell, $SINR_{ES}$ represents the signal quality of the energy-saving cell measured by the user equipment of the energy-saving cell, and $SINR_{CP}$ represents the signal quality of the compensation cell measured by the user equipment of the energy-saving cell.

In particular implementation, in another embodiment, the resource estimating unit is configured to estimate a modulation coding scheme needing to be adopted by the user equipment in the compensation cell according the signal quality of the compensation cell measured by the user equipment of the energy-saving cell; and to estimate the resource needing to be occupied in the compensation cell according the modulation coding scheme.

Figure 9:
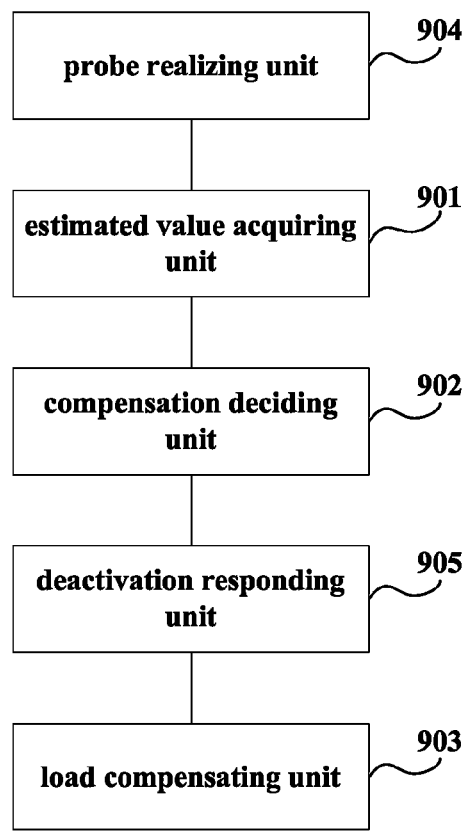
FIG. 9 is another schematic diagram of the structure of the base station of Embodiment 1 of the present invention.

FIG. 9 is another schematic diagram of the structure of the base station of the embodiment of the present invention. As shown in FIG. 9, the base station of compensation cell includes: an estimated value acquiring unit 901, a compensation deciding unit 902 and a load compensating unit 903, as described above.

As shown in FIG. 9, the base station may further include a probe realizing unit 904 configured to probe through increasing the transmission power of one or more subframes, so that the user equipment of the energy-saving cell measures the signal quality of the compensation cell according to the one or more subframes.

In an embodiment, the base station may further include a probe request receiving unit and a probe request responding unit (not shown), wherein the probe request receiving unit is configured to receive a probe request message transmitted by the base station of the energy-saving cell, the probe request message including probe resources acceptable to the base station of the energy-saving cell; and the probe request responding unit is configured to feed a probe response message back to the base station of the energy-saving cell, the probe response message including the resources used by the base station of the compensation cell for probing.

In another embodiment, the base station may further include a probe request transmitting unit and a probe request feeding back unit (not shown), wherein the probe request transmitting unit is configured to transmit a probe request message to the base station of the energy-saving cell, the probe request message including the resources used by the base station of the compensation cell for probing; and the probe request feeding back unit is configured to receive a probe response message fed back by the base station of the energy-saving cell, the probe response message including probe resources acceptable to the base station of the energy-saving cell.

As shown in FIG. 9, the base station may further include a deactivation responding unit 905 configured to transmit a deactivation response message to the base station of the energy-saving cell after it is determined by the compensation deciding unit 902 to compensate for the energy-saving cell, the deactivation response message including information on the resources used for compensation.

It can be seen from the above embodiment that the base station of the compensation cell determines whether to compensate for the energy-saving cell according to an estimated value of the resources of the compensation cell needed by the user equipment of the energy-saving cell, which may reflect the occupied resources of the compensation cell, thereby improving the accuracy of load compensation.

Embodiment 2

An embodiment of the present invention provides a load compensation method, applicable to a communication system jointly served by a compensation cell and an energy-saving cell. The method shall be described in detail below at a base station side of the energy-saving cell, wherein, the parts identical those at the base station side of the compensation cell shall not be described herein any further.

Figure 10:
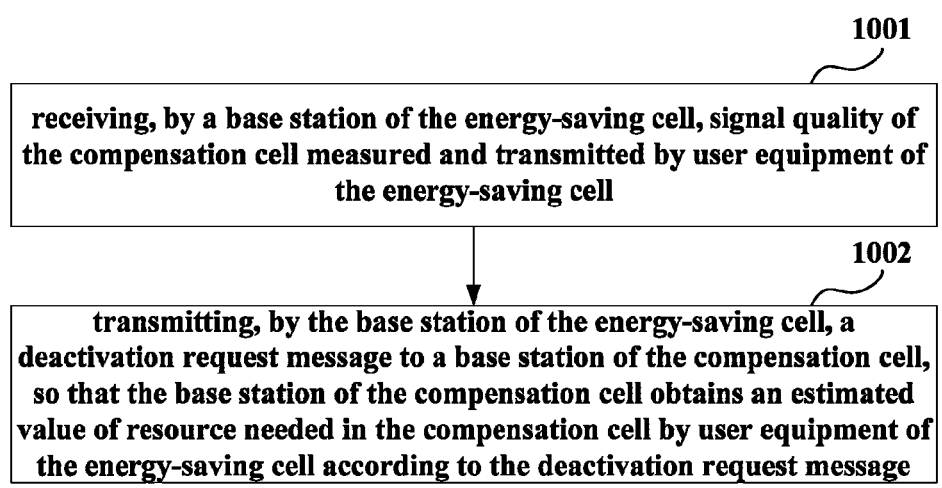
FIG. 10 is a flowchart of the load compensation method of Embodiment 2 of the present invention.

FIG. 10 is a flowchart of the load compensation method of the embodiment of the present invention. As shown in FIG. 10, the method includes:

step 1001: receiving, by a base station of the energy-saving cell, signal quality of the compensation cell measured and transmitted by user equipment of the energy-saving cell; and step 1002: transmitting, by the base station of the energy-saving cell, a deactivation request message to a base station of the compensation cell, so that the base station of the compensation cell obtains an estimated value of a resource needed by user equipment of the energy-saving cell in the compensation cell according to the deactivation request message.

In an embodiment, the deactivation request message includes signal quality of the compensation cell measured by the user equipment of the energy-saving cell. Therefore, the base station of the compensation cell may estimate the estimated value of the resources in the compensation cell needed by the user equipment of the energy-saving cell according to the signal quality of the compensation cell.

In another embodiment, the deactivation request message includes an estimated value of a resource needed by user equipment of the energy-saving cell in the compensation cell. Therefore, after step 1001 and before the deactivation request transmitting step in step 1002, the method further includes: a resource estimating step: obtaining the estimated value of the resource by the base station of the energy-saving cell through estimation according to the signal quality of the compensation cell measured by the user equipment of the energy-saving cell.

In particular implementation, in an embodiment, the following formula is adopted in the resource estimating step to obtain the estimated value of the resource of the compensation cell occupied by each piece of user equipment of the energy-saving cells through estimation:

$$BW_{ES}\log_2(1+SINR_{ES})=BW_{CP}\log_2(1+SINR_{CP})$$

where, $BW_{ES}$ represents the resource occupied by the user equipment of the energy-saving cell in the energy-saving cell, $BW_{CP}$ represents the resource occupied by the user equipment of the energy-saving cell in the compensation cell, $SINR_{ES}$ represents the signal quality of the energy-saving cell measured by the user equipment of the energy-saving cell, and $SINR_{CP}$ represents the signal quality of the compensation cell measured by the user equipment of the energy-saving cell.

Furthermore, estimated values of the resources of the compensation cell occupied by all the user equipment of the energy-saving cell may be calculated after obtaining the estimated value of the resource of the compensation cell occupied by each piece of user equipment of the energy-saving cell. This may be performed in manners of summation, or weighted averaging, etc. However, it is not limited thereto, and particular manners may be determined as actually required.

In particular implementation, in another embodiment, the resource estimating step includes: estimating a modulation coding scheme needing to be adopted by the user equipment in the compensation cell according to the signal quality of the compensation cell measured by the user equipment of the energy-saving cell; and estimating the resource needing to be occupied in the compensation cell according the modulation coding scheme.

In this embodiment, before the signal value receiving step in step 1001, the method may further include: a probe configuring step: configuring, by the base station of the energy-saving cell, in one or more subframes whose transmission power is increased by the base station of the compensation cell, so that the user equipment of the energy-saving cell measures signal quality of the compensation cell according to the one or more subframes.

In an embodiment, before the probe configuring step, the method may further include:

a probe request receiving step: receiving, by the base station of the energy-saving cell, a probe request message transmitted by the base station of the compensation cell, the probe request message including the resources used by the base station of the compensation cell for probing; and a probe request responding step: feeding a probe response message back to the base station of the compensation cell, the probe response message including probe resources acceptable to the base station of the energy-saving cell.

In another embodiment, before the probe configuring step, the method may further include:

a probe request transmitting step: transmitting, by the base station of the energy-saving cell, a probe request message to the base station of the compensation cell, the probe request message including the probe resources acceptable to the base station of the energy-saving cell; and a probe request feeding back step: receiving a probe response message fed back by the base station of the compensation cell, the probe response message including resources used by the base station of the compensation cell for probing.

In this embodiment, after the deactivation request transmitting step in step 1002, the method may further include:

a deactivation response receiving step: receiving a deactivation response message transmitted by the base station of the compensation cell, the deactivation response message including information on the resources used for compensation; and a compensation processing step: handing over the user equipment from the energy-saving cell to the compensation cell according to the deactivation response message, and switching off the energy-saving cell.

Figure 11:
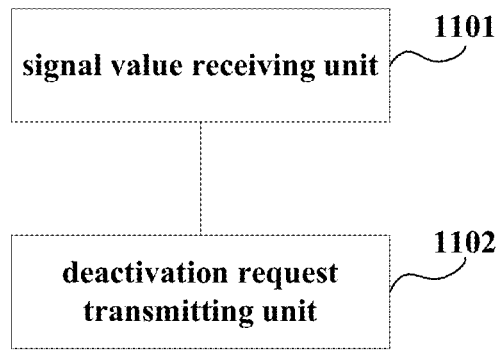
FIG. 11 is a schematic diagram of the structure of the base station of Embodiment 2 of the present invention.

An embodiment of the present invention further provides a base station of energy-saving cell, applicable to a communication system jointly served by a compensation cell and an energy-saving cell. FIG. 11 is a schematic diagram of the structure of the base station of the embodiment of the present invention. As shown in FIG. 11, the base station of energy-saving cell includes: a signal value receiving unit 1101 and a deactivation request transmitting unit 1102;

wherein, the signal value receiving unit 1101 is configured to receive signal quality of the compensation cell measured and transmitted by user equipment of the energy-saving cell; and the deactivation request transmitting unit 1102 is configured to transmit a deactivation request message to a base station of the compensation cell, so that the base station of the compensation cell obtains an estimated value of a resource needed by user equipment of the energy-saving cell in the compensation cell according to the deactivation request message.

Figure 12:
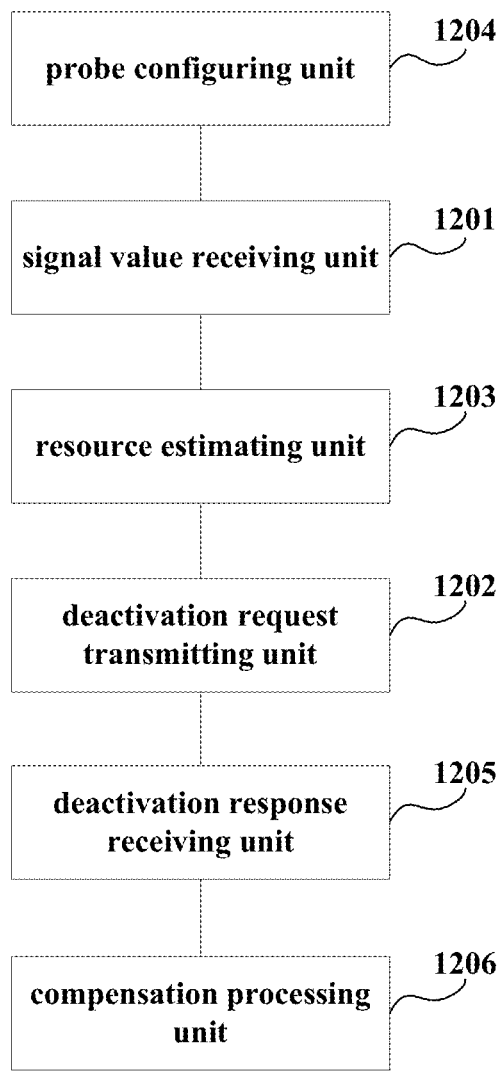
FIG. 12 is another schematic diagram of the structure of the base station of Embodiment 2 of the present invention.

FIG. 12 is another schematic diagram of the structure of the base station of the embodiment of the present invention. As shown in FIG. 12, the base station of energy-saving cell includes: a signal value receiving unit 1201 and a deactivation request transmitting unit 1202, as described above.

As shown in FIG. 12, the base station may further include: a resource estimating unit 1203 configured to obtain the estimated value of the resource through estimation according to the signal quality of the compensation cell measured by the user equipment of the energy-saving cell.

As shown in FIG. 12, the base station may further include: a probe configuring unit 1204 configured to configure in one or more subframes whose transmission power is increased by the base station of the compensation cell, so that the user equipment of the energy-saving cell measures signal quality of the compensation cell according to the one or more subframes.

In an embodiment, the base station may further include: a probe request receiving unit and a probe request responding unit (not shown), wherein, the probe request receiving unit is configured to receive a probe request message transmitted by the base station of the compensation cell, the probe request message including the resources used by the base station of the compensation cell for probing; and the probe request responding unit is configured to feed a probe response message back to the base station of the compensation cell, the probe response message including probe resources acceptable to the base station of the energy-saving cell.

In another embodiment, the base station may further include: a probe request transmitting unit and a probe request feeding back unit (not shown), wherein, the probe request transmitting unit is configured to transmit a probe request message to the base station of the compensation cell, the probe request message including the probe resources acceptable to the base station of the energy-saving cell; and the probe request feeding back unit is configured to receive a probe response message fed back by the base station of the compensation cell, the probe response message including resources used by the base station of the compensation cell for probing.

As shown in FIG. 12, the base station may further include: a deactivation response receiving unit 1205 and a compensation processing unit 1206, wherein, the deactivation response receiving unit 1205 is configured to receive a deactivation response message transmitted by the base station of the compensation cell, the deactivation response message including information on the resources used for compensation; and the compensation processing unit 1206 is configured to hand over the user equipment from the energy-saving cell to the compensation cell according to the deactivation response message, and switching off the energy-saving cell.

It can be seen from the above embodiment that the base station of the compensation cell determines whether to compensate for the energy-saving cell according to an estimated value of the resources of the compensation cell needed by the user equipment of the energy-saving cell, which may reflect the occupied resources of the compensation cell, thereby improving the accuracy of load compensation.

Embodiment 3

An embodiment of the present invention provides a measuring method for load estimation, applicable to a communication system jointly served by a compensation cell and an energy-saving cell, wherein, the parts identical those in Embodiment 1 or 2 shall not be described herein any further.

At the base station side of compensation cell:

FIG. 13 is a flowchart of the measuring method for load estimation of the embodiment of the present invention. As shown in FIG. 13, the method includes:

step 1301: probing, by a base station of the compensation cell, through increasing transmission power of one or more subframes, so that user equipment of the energy-saving cell measures signal quality of the compensation cell according to the one or more subframes;

wherein the base station of the compensation cell increases the transmission power of the whole subframes of the one or more subframes, or increases the transmission power of partial resources of the one or more subframes.

At the base station side of energy-saving cell:

FIG. 14 is another flowchart of the measuring method for load estimation of the embodiment of the present invention. As shown in FIG. 14, the method includes:

step 1401: measuring, by user equipment of the energy-saving cell, signal quality of the compensation cell according to one or more subframes whose transmission power is increased by a base station of the compensation cell.

As shown in FIG. 14, after the signal measuring step in step 1401, the method may further include:

step 1402: transmitting, by the user equipment of the energy-saving cell, the measured signal quality of the compensation cell to a base station of the energy-saving cell.

Figure 15:
FIG. 15 is a schematic diagram of the structure of the base station of Embodiment 3 of the present invention.

An embodiment of the present invention further provides a base station, applicable to a communication system jointly served by a compensation cell and an energy-saving cell. FIG. 15 is a schematic diagram of the structure of the base station of the embodiment of the present invention. As shown in FIG. 15, the base station includes: a probe realizing unit 1501.

The probe realizing unit 1501 is configured to probe through increasing transmission power of one or more subframes, so that user equipment of the energy-saving cell measures signal quality of the compensation cell according to the one or more subframes.

Figure 16:
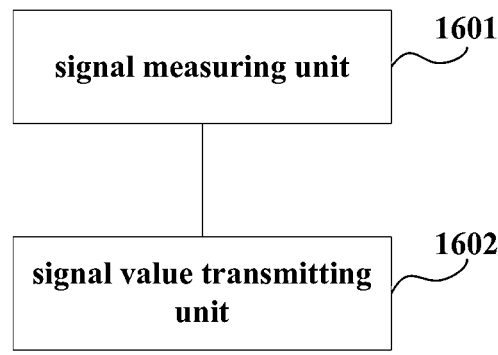
FIG. 16 is a schematic diagram of the structure of the user equipment of Embodiment 3 of the present invention.

An embodiment of the present invention further provides user equipment, applicable to a communication system jointly served by a compensation cell and an energy-saving cell. FIG. 16 is a schematic diagram of the structure of the user equipment of the embodiment of the present invention. As shown in FIG. 16, the user equipment includes: a signal measuring unit 1601;

wherein, the signal measuring unit 1601 is configured to measure signal quality of the compensation cell according to one or more subframes with transmission power being increased by a base station of the compensation cell.

As shown in FIG. 16, the user equipment may further include: a signal value transmitting unit 1602. The signal value transmitting unit 1602 is configured to transmit the measured signal quality of the compensation cell to a base station of the energy-saving cell.

It can be seen from the above embodiment that whether to compensate for the energy-saving cell is determined according to an estimated value of the resources of the compensation cell needed by the user equipment of the energy-saving cell, which may reflect the occupied resources of the compensation cell, thereby improving the accuracy of load compensation.

An embodiment of the present invention further provides a computer-readable program, wherein when the program is executed in user equipment, the program enables the computer to carry out the method as described above in the user equipment.

An embodiment of the present invention further provides a storage medium in which a computer-readable program is stored, wherein the computer-readable program enables the computer to carry out the method as described above in user equipment.

An embodiment of the present invention further provides a computer-readable program, wherein when the program is executed in a base station, the program enables the computer to carry out the method as described above in the base station.

An embodiment of the present invention further provides a storage medium in which a computer-readable program is stored, wherein the computer-readable program enables the computer to carry out the method as described above in a base station.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A base station, applicable to a communication system jointly served by a compensation cell and an energy-saving cell, the base station comprising:
   an estimated value acquiring unit, configured to obtain an estimated value of a resource needed by user equipment of the energy-saving cell in the compensation cell according to signal quality of the compensation cell measured by the user equipment of the energy-saving cell;
   a compensation deciding unit, configured to determine whether to compensate for the energy-saving cell according to the estimated value of the resource needed by the user equipment of the energy-saving cell in the compensation cell; and
   a load compensating unit, configured to increase power of related resources to compensate for the energy-saving cell after it is determined by the compensation deciding unit to compensate for the energy-saving cell.

2. The base station according to claim 1, wherein the estimated value acquiring unit comprises:
   a deactivation request receiving unit, configured to receive a deactivation request message transmitted by a base station of the energy-saving cell, the deactivation request message comprising the estimated value of the resource, and the estimated value of the resource being obtained by the base station of the energy-saving cell through estimation according to the signal quality of the compensation cell measured by the user equipment of the energy-saving cell.

3. The base station according to claim 1, wherein the estimated value acquiring unit comprises:
   a deactivation request receiving unit, configured to receive a deactivation request message transmitted by a base station of the energy-saving cell, the deactivation request message comprising the signal quality of the compensation cell measured by the user equipment of the energy-saving cell; and
   a resource estimating unit, configured to obtain the estimated value of the resource through estimation according to the signal quality of the compensation cell measured by the user equipment of the energy-saving cell.

4. The base station according to claim 3, wherein the resource estimating unit adopts the following formula to estimate the resource of the compensation cell occupied by one piece of user equipment of the energy-saving cell:

$$BW_{ES}\log_2(1+SINR_{ES})=BW_{CP}\log_2(1+SINR_{CP})$$

where, $BW_{ES}$ represents the resource occupied by the user equipment of the energy-saving cell in the energy-saving cell, $BW_{CP}$ represents the resource occupied by the user equipment of the energy-saving cell in the compensation cell, $SINR_{ES}$ represents the signal quality of the energy-saving cell measured by the user equipment of the energy-saving cell, and $SINR_{CP}$ represents the signal quality of the compensation cell measured by the user equipment of the energy-saving cell.

5. The base station according to claim 3, wherein the resource estimating unit is configured to estimate a modulation coding scheme needing to be adopted by the user equipment in the compensation cell according to the signal quality of the compensation cell measured by the user equipment of the energy-saving cell; and to estimate the resource needing to be occupied in the compensation cell according to the modulation coding scheme.

6. The base station according to claim 1, wherein the base station further comprises:
   a probe realizing unit, configured to probe through increasing transmission power of one or more subframes, so that the user equipment of the energy-saving cell measures the signal quality of the compensation cell according to the one or more subframes.

7. The base station according to claim 6, wherein the base station further comprises:
   a probe request receiving unit, configured to receive a probe request message transmitted by the base station of the energy-saving cell, the probe request message comprising probe resources acceptable to the base station of the energy-saving cell; and a probe request responding unit, configured to feed a probe response message back to the base station of the energy-saving cell, the probe response message comprising the resources used by the base station of the compensation cell for probing.

8. The base station according to claim 6, wherein the base station further comprises:

a probe request transmitting unit, configured to transmit a probe request message to the base station of the energy-saving cell, the probe request message comprising the resources used by the base station of the compensation cell for probing; and a probe request feeding back unit, configured to receive a probe response message fed back by the base station of the energy-saving cell, the probe response message comprising probe resources acceptable to the base station of the energy-saving cell.

9. The base station according to claim 1, wherein the base station further comprises:

a deactivation responding unit, configured to transmit a deactivation response message to the base station of the energy-saving cell after it is determined by the compensation deciding unit to compensate for the energy-saving cell, the deactivation response message comprising information on the resources used for compensation.

10. A base station, applicable to a communication system jointly served by a compensation cell and an energy-saving cell, the base station comprising:

a signal value receiving unit, configured to receive a signal quality of the compensation cell measured and transmitted by user equipment of the energy-saving cell; and a deactivation request transmitting unit, configured to transmit a deactivation request message to a base station of the compensation cell, so that the base station of the compensation cell obtains an estimated value of a resource needed by user equipment of the energy-saving cell in the compensation cell according to the deactivation request message.

11. The base station according to claim 10, wherein the base station further comprises:

a resource estimating unit, configured to obtain the estimated value of the resource through estimation according to the signal quality of the compensation cell measured by the user equipment of the energy-saving cell.

12. The base station according to claim 10, wherein the base station further comprises:

a probe configuring unit, configured to configure in one or more subframes whose transmission power is increased by the base station of the compensation cell, so that the user equipment of the energy-saving cell measures the signal quality of the compensation cell according to the one or more subframes.

13. The base station according to claim 12, wherein the base station further comprises:

a probe request receiving unit, configured to receive a probe request message transmitted by the base station of the compensation cell, the probe request message comprising the resources used by the base station of the compensation cell for probing; and a probe request responding unit, configured to feed a probe response message back to the base station of the compensation cell, the probe response message comprising probe resources acceptable to the base station of the energy-saving cell.

14. The base station according to claim 12, wherein the base station further comprises:

a probe request transmitting unit, configured to transmit a probe request message to the base station of the compensation cell, the probe request message comprising probe resources acceptable to the base station of the energy-saving cell; and a probe request feeding back unit, configured to receive a probe response message fed back by the base station of the compensation cell, the probe response message comprising resources used by the base station of the compensation cell for probing.

15. The base station according to claim 12, wherein the base station further comprises:

a deactivation response receiving unit, configured to receive a deactivation response message transmitted by the base station of the compensation cell, the deactivation response message comprising information on the resources used for compensation; and a compensation processing unit, configured to hand over the user equipment from the energy-saving cell to the compensation cell according to the deactivation response message, and switching off the energy-saving cell.

* * * * *